(12) United States Patent
Tsubaki et al.

(10) Patent No.: US 9,581,845 B2
(45) Date of Patent: Feb. 28, 2017

(54) LIQUID CRYSTAL DISPLAY DEVICE, ELECTRONIC APPARATUS, AND METHOD OF FIXING DISPLAY COVER

(71) Applicant: Japan Display Inc., Tokyo (JP)

(72) Inventors: Yuichi Tsubaki, Tokyo (JP); Satoru Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 127 days.

(21) Appl. No.: 14/179,916

(22) Filed: Feb. 13, 2014

(65) Prior Publication Data

US 2014/0232969 A1    Aug. 21, 2014

(30) Foreign Application Priority Data

Feb. 20, 2013    (JP) .................................. 2013-031556

(51) Int. Cl.
*G02F 1/1333*    (2006.01)

(52) U.S. Cl.
CPC .................... *G02F 1/133308* (2013.01); *G02F 2001/133317* (2013.01); *G02F 2001/133331* (2013.01); *G02F 2202/28* (2013.01)

(58) Field of Classification Search
CPC .......................................... G02F 2001/133331
See application file for complete search history.

(56) References Cited

U.S. PATENT DOCUMENTS

| | | | | |
|---|---|---|---|---|
| 5,768,979 | A * | 6/1998 | Antoine | 219/622 |
| 5,830,308 | A * | 11/1998 | Reichard | 156/291 |
| 2011/0051348 | A1* | 3/2011 | Song | 361/679.26 |
| 2012/0279560 | A1* | 11/2012 | Sumida et al. | 136/251 |

FOREIGN PATENT DOCUMENTS

| | | |
|---|---|---|
| JP | H04-055822 | 2/1992 |
| JP | 2001-183628 | 7/2001 |
| JP | 2003-255847 | 9/2003 |
| JP | 2010-217340 | 9/2010 |
| JP | 2011-075605 | 4/2011 |

OTHER PUBLICATIONS

Office Action issued in JP Application 2013-031556, mailed Jan. 19, 2016 (13 pages).

* cited by examiner

*Primary Examiner* — Nathanael R Briggs
*Assistant Examiner* — Alexander Gross
(74) *Attorney, Agent, or Firm* — K&L Gates LLP

(57) ABSTRACT

The present disclosure includes a liquid crystal panel; a backlight that illuminates the liquid crystal panel; a display cover that covers a display surface of the liquid crystal panel; a housing case that houses the backlight; a display cover support case to whose inside the housing case is fixed and whose outer circumferential surface serves as a pasting surface pasted to the display cover; pressure-sensitive adhesive members that are arranged between the pasting surface of the display cover support case and the display cover, and join together the display cover and the display cover support case with a pressure-sensitive adhesive force; and an adhesive that is arranged in an area located on the pasting surface and interposed between the pressure-sensitive adhesive members in the longitudinal direction of the pasting surface, and that bonds together the display cover and the display cover support case.

12 Claims, 9 Drawing Sheets

LIQUID CRYSTAL DISPLAY DEVICE, ELECTRONIC APPARATUS, AND METHOD OF FIXING DISPLAY COVER

CROSS REFERENCES TO RELATED APPLICATIONS

The present application claims priority to Japanese Priority Patent Application JP 2013-031556 filed in the Japan Patent Office on Feb. 20, 2013, the entire content of which is hereby incorporated by reference.

BACKGROUND

1. Technical Field

The present disclosure relates to a liquid crystal display device and an electronic apparatus that include a liquid crystal panel, a display cover, and a display cover support case, and to a method of fixing the display cover.

2. Description of the Related Art

There are liquid crystal display devices as display devices mounted in, for example, vehicle on-board navigation systems. The liquid crystal display device includes a liquid crystal display (LCD) panel (liquid crystal panel) having a display surface composed of thin glass. Thus, the LCD panel, when used in an exposed state, could be broken by an external force or an impact. To cope with this, some liquid crystal display devices include an LCD panel, the display surface side of which is fixed to a transparent cover window (cover glass) through which the display surface is visible. Providing the cover window can cover the display surface of the LCD panel to protect it.

A liquid crystal display device (refer to Japanese Laid-open Patent Publication No. 2003-255847) uses a method of fixing a cover glass such as mentioned above to the liquid crystal display device, in which a portion of a double-sided pressure-sensitive adhesive tape facing a display surface of an LCD panel is cut out in a rectangular shape thus forming a ring-shaped double-sided pressure-sensitive adhesive tape, which, in turn, is pasted onto a peripheral end surface of a case (housing) to contain a component such as a backlight, and then a cover window is pasted onto a surface opposite to the surface thus pasted. In this liquid crystal display device, pasting the cover window to the case with the double-sided pressure-sensitive adhesive tape fixes the cover window to the case on the display surface side of the LCD panel.

The liquid crystal display device disclosed in Japanese Laid-open Patent Publication No. 2003-255847 employs the ring-shaped double-sided pressure-sensitive adhesive tape (double-sided pressure-sensitive adhesive sheet). Thus, the case and the cover window are joined together by a pressure-sensitive adhesive force applied over the entire circumference of the case. In this case, fixing of the entire circumference of the case to the cover window by a strong pressure-sensitive adhesive force acts as a stress on the cover window when the case is deformed under the influence of warping of the backlight, and thus could generate a twist of the cover window due to the stress applied from the case to the cover window. The generation of the twist of the cover window could produce display unevenness on the display surface of the liquid crystal panel fixed on the cover glass.

When the case and the cover window are joined together only by the double-sided pressure-sensitive adhesive tape, a weak pressure-sensitive adhesive force of the double-sided pressure-sensitive adhesive tape could cause the cover window to be misaligned or come unstuck from the case by vibration or the like.

SUMMARY

According to an aspect, a liquid crystal display device comprises: a liquid crystal panel; a backlight that is stacked on the liquid crystal panel and illuminates the liquid crystal panel; a display cover that covers a display surface of the liquid crystal panel; a housing case that houses the backlight; a display cover support case to which the housing case is fixed and on which, near an outer edge of a surface facing the display cover of the display cover support case, a pasting surface to which the display cover is to be pasted is formed; pressure-sensitive adhesive members that are arranged between the pasting surface of the display cover support case and the display cover, and join together the display cover and the display cover support case with a pressure-sensitive adhesive force; and an adhesive that is arranged in an area located on the pasting surface and interposed between the pressure-sensitive adhesive members in a longitudinal direction of the pasting surface, and that bonds together the display cover and the display cover support case.

According to another aspect, an electronic apparatus comprises: the liquid crystal display device; and a control device that controls a display operation of the liquid crystal display device.

According to still another aspect, a method of fixing a display cover that pastes and fixes the display cover covering a display surface of a liquid crystal panel to a display cover support case fixed to a housing case housing a backlight, the method comprises: arranging pressure-sensitive adhesive members between a pasting surface to which the display cover is to be pasted formed on the display cover support case and a surface facing the pasting surface of the display cover, and joining together the display cover and the display cover support case with a pressure-sensitive adhesive force; and filling, with an adhesive, an adhesive filling hole drilled in a pasting plate portion including the pasting surface formed on the display cover support case, and bringing the adhesive into contact with the display cover so as to bond together the display cover and the display cover support case.

Additional features and advantages are described herein, and will be apparent from the following Detailed Description and the figures.

DETAILED DESCRIPTION

Embodiment

Configuration of Liquid Crystal Display Device 1

Figure 1:
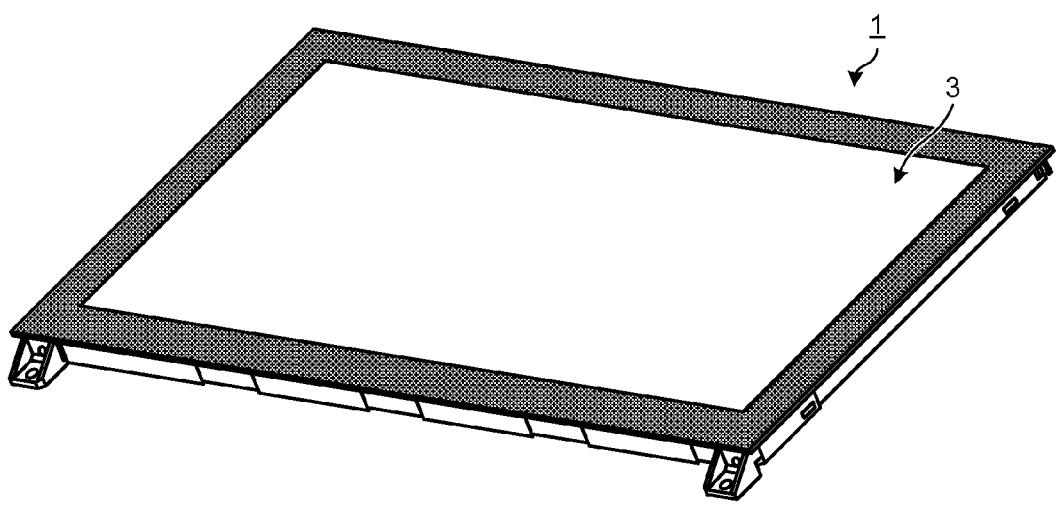
FIG. 1 is an overall perspective view of a liquid crystal display device according to an embodiment of the present disclosure.
Figure 2:
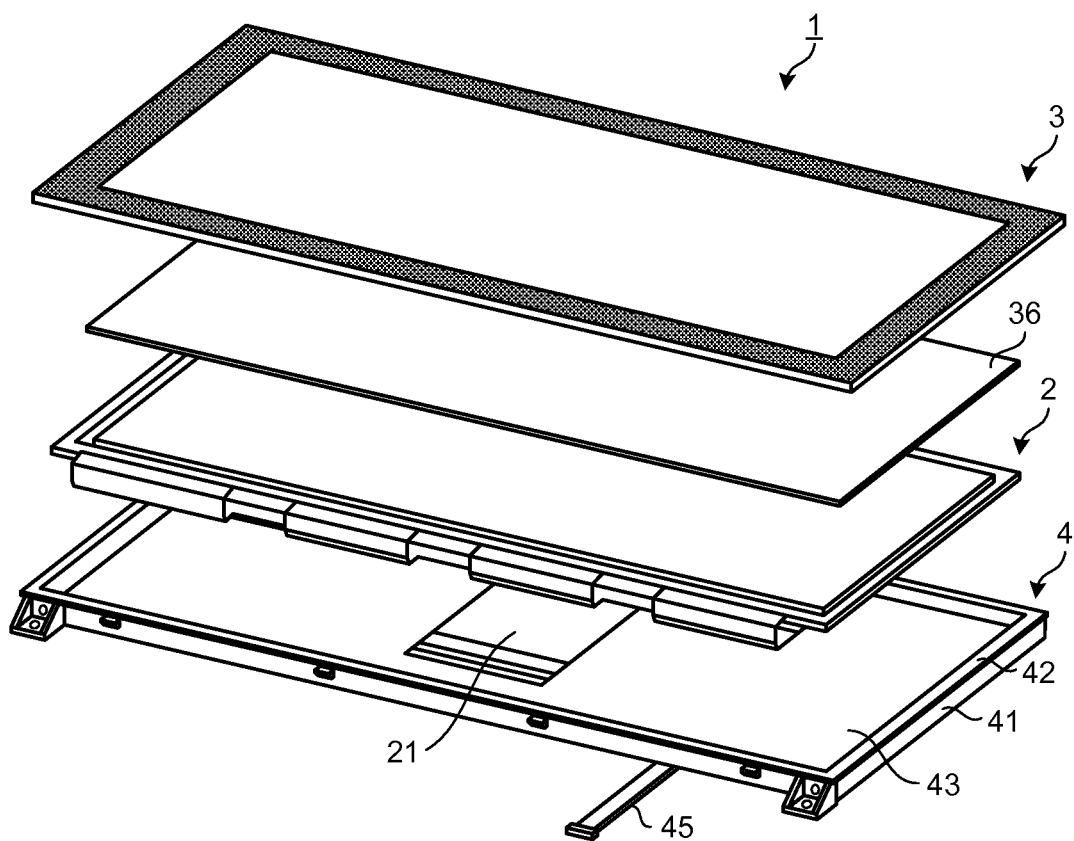
FIG. 2 is an exploded perspective view of the liquid crystal display device according to the embodiment.
Figure 3:
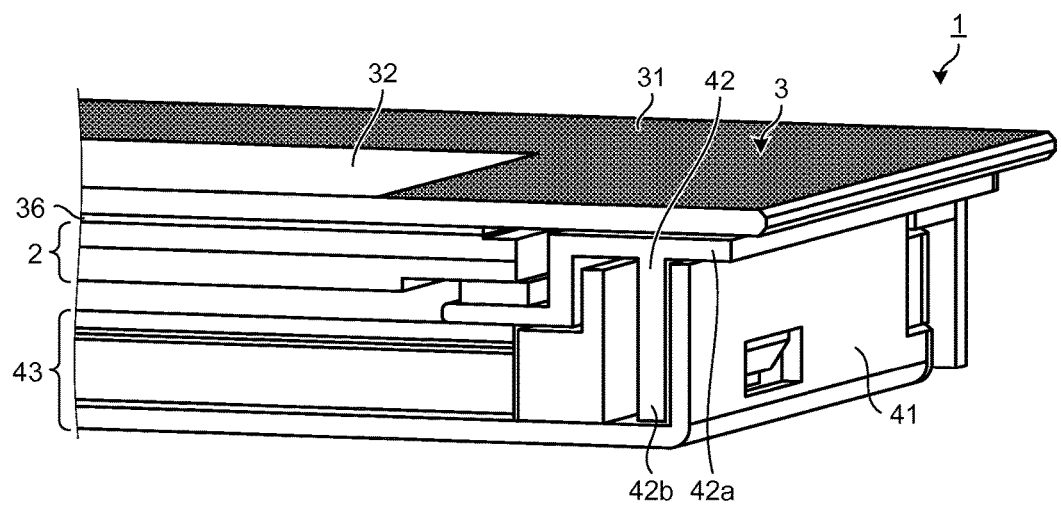
FIG. 3 is a sectional view of an essential part of the liquid crystal display device according to the embodiment.

FIG. 1 is an overall perspective view of a liquid crystal display device according to an embodiment of the present disclosure; FIG. 2 is an exploded perspective view of the liquid crystal display device; and FIG. 3 is a sectional view of an essential part of the liquid crystal display device. A configuration of this liquid crystal display device 1 according to the embodiment will be described with reference to FIGS. 1 to 3.

As illustrated in FIGS. 1 and 2, the liquid crystal display device 1 includes a liquid crystal display (LCD) panel (liquid crystal panel) 2, a cover glass (display cover) 3, and a backlight unit 4.

A liquid crystal layer is formed between two transparent substrates of the LCD panel 2. The LCD panel 2 of the present embodiment is a liquid crystal display of a fringe field switching (FFS) type, in which drive electrodes (common electrodes) and pixel electrodes are stacked on one of the transparent substrates, the pixel electrodes being formed in a matrix corresponding to pixels. At least one of the two transparent substrates is provided with a color filter in which filters of, for example, red (R), green (G), and blue (B) are arranged corresponding to the pixels. Either of the pixel electrode and the drive electrode (common) of the LCD panel 2 is formed with an opening. The LCD panel 2 drives the liquid crystal with an electric field (fringe electric field) leaked from the opening. The LCD panel 2 displays an image by switching between transmission and shielding of light at each of the pixels based on an image signal. A surface on which the pixels are arranged in a matrix, that is, a surface (panel surface, or front surface) having the largest area of the LCD panel 2 is disposed substantially parallel to an illumination surface of the backlight unit 4 (to be described later). The liquid crystal display of the LCD panel 2 is of the FFS type, but may be of an in-plane switching (IPS) type, a twisted nematic (TN) type, an optically compensated bend (or optically compensated birefringence) (OCB) type, or an electrically controlled birefringence (ECB) type. The LCD panel 2 can use either a normally black mode in which black is displayed because the light is not transmitted when no voltage is applied, or a normally white mode in which white is displayed because the light is transmitted when no voltage is applied. The LCD panel 2 is connected to a flexible printed circuit (FPC) 21, as illustrated in FIG. 2. The FPC 21 is connected to an external device (control device) that transmits control signals to the LCD panel 2 to control display operations thereof.

The cover glass 3 is a transparent glass member that protects a display surface of the LCD panel 2 by covering it so as to be disposed on the display side of the LCD panel 2. The cover glass 3 is fixed to a cover glass support case 42. The cover glass 3 is provided, at an outer circumferential portion on a plate surface thereof, with a light-shielding area 31 that shields the light from the LCD panel 2, and provided, in an area surrounded by the light-shielding area 31 (i.e., inside the light-shielding area 31), with a display area 32 that transmits the light from the LCD panel 2. The cover glass 3 has a plate-like glass substrate 33 (to be described later) as a base material. The light-shielding area 31 is provided by printing, using screen printing for example, a light-shielding member (light-shielding layer 34 to be described later) in the area of the outer circumferential portion from a light source side of the glass substrate 33. While, in FIG. 3, the light-shielding member is illustrated as being disposed on the outer surface of the cover glass 3, the light-shielding member is preferably disposed on the surface on the light source side of the cover glass 3, using the screen printing for example. As illustrated in FIGS. 2 and 3, the display surface of the LCD panel 2 is pasted onto the cover glass 3 with an ultraviolet curing resin (UV curing resin) 36. The UV curing resin 36 is a synthetic resin that reacts to light energy of ultraviolet rays to chemically change from a liquid to a solid.

The liquid crystal display device 1 of the present embodiment is provided with the cover glass 3 as a display cover that protects the surface on the display side (i.e., the display surface) of the LCD panel 2, and the cover glass 3 is fixed to the LCD panel 2. However, the liquid crystal display device 1 is not limited to this. The liquid crystal display device 1 can use various types of plate-like light-transmitting display covers, provided that they can protect the front surface of the LCD panel 2 and can transmit the image displayed on the LCD panel 2. A transparent resin member or a touch panel can be used as the display cover.

The backlight unit 4 includes a housing case 41, a cover glass support case 42 (display cover support case), and a backlight 43.

The housing case 41 is a metal case having a rectangular box shape, and houses the backlight 43 in a fixed manner while shielding light emitted from the backlight 43 so as to prevent the light from leaking outward. The housing case 41 may be a resin case when taking into account the convenience of forming, for example. The housing case 41 also exerts a shielding effect for the LCD panel 2 whose panel surface is disposed substantially parallel to the illumination surface of the backlight 43.

The cover glass support case 42 includes a pasting plate portion 42a on which the cover glass 3 is pasted at the light-shielding area 31 thereof, and a side plate portion 42b that extends from a surface on the light source side of the pasting plate portion 42a in a direction substantially orthogonal thereto. The cover glass support case 42 is fitted in the housing case 41 so that the outer surface of the side plate portion 42b face the inner surface of a sidewall of the box-shaped housing case 41. A plurality of hook portions provided on the side plate portion 42b are inserted into openings of the housing case 41 so that the cover glass support case 42 is fixed to the housing case 41. When the cover glass 3 to which the LCD panel 2 adheres with the UV curing resin 36 is pasted, at the light-shielding area 31 thereof, onto the pasting plate portion 42a, a part of the cover glass support case 42 faces a peripheral portion of the LCD panel 2, and protects the LCD panel 2.

The backlight 43 is a mechanism that projects light to the LCD panel 2, and is disposed facing the LCD panel 2. The backlight 43 includes a light source that emits the light, a light guide plate that receives incident light output from the light source and guides the incident light to be projected toward the LCD panel 2, and an optical sheet stacked on the light projecting surface side of the light guide plate. The light source can use a light-emitting diode (LED) or a fluorescent lamp. A flexible cable 45 illustrated in FIG. 2 extends from the light source toward the outside of the housing case 41 and the cover glass support case 42. The backlight 43 is also provided with an optical sheet support member that is disposed on one side of the rectangular light guide plate, and fixes the optical sheet disposed on the display side of the light guide plate. While the backlight 43 in the present embodiment uses the light guide plate and emits the light from the emission surface of the light guide plate, the backlight 43 is not limited to this. The backlight 43 can use a point light source such as an LED or a linear light source such as a cold cathode fluorescent lamp (CCFL). A plurality of such point light sources or linear light sources may be arranged as the backlight 43 so as to make the light enter the whole area of the display surface of the LCD panel 2.

Arrangement Configuration of Double-Sided Pressure-Sensitive Adhesive Tapes 51 and Adhesive Application Portions 35 on Cover Glass 3

Figure 4:
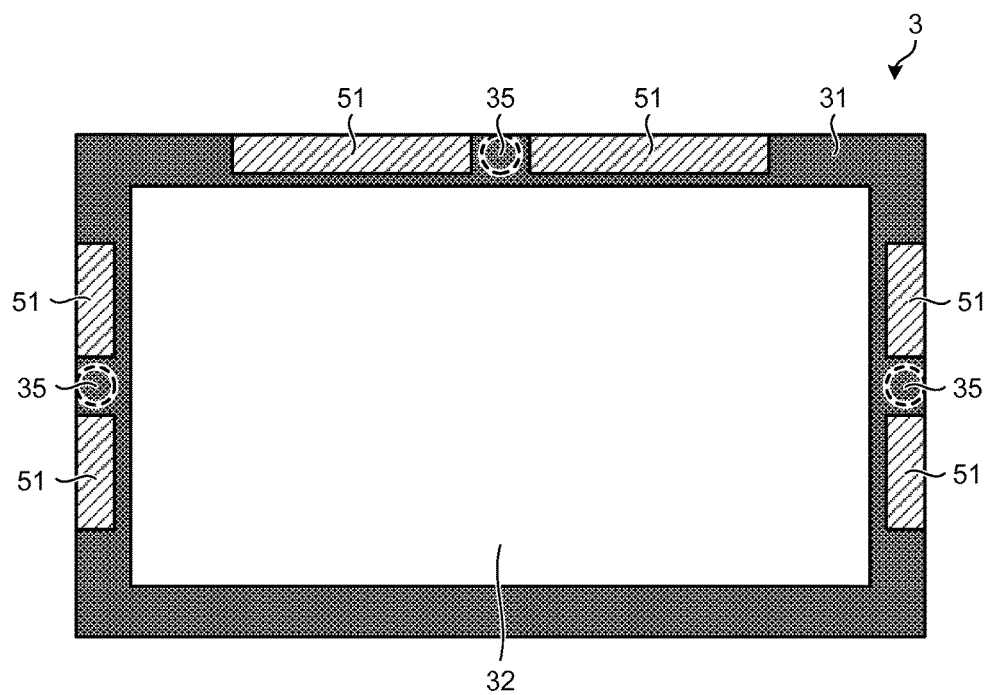
FIG. 4 is a view illustrating an arrangement configuration of double-sided pressure-sensitive adhesive tapes and adhesive application portions on a cover glass of the embodiment.

FIG. 4 is a view illustrating an arrangement configuration of double-sided pressure-sensitive adhesive tapes and adhesive application portions on the cover glass of the embodiment. With reference to FIG. 4, a description will be made of these double-sided pressure-sensitive adhesive tapes 51 and an adhesive 61 that paste the cover glass support case 42 onto the cover glass 3 (i.e., that join the cover glass 3 with the cover glass support case 42), and of these adhesive application portions 35 to which the adhesive 61 is applied.

As illustrated in FIG. 4, the rectangular cover glass 3 has areas that lie along three of four sides of the outer edge of the surface thereof facing the cover glass support case 42 and that overlap the light-shielding area 31, and two of the double-sided pressure-sensitive adhesive tapes (pressure-sensitive adhesive members) 51 are pasted on each of the areas along the side direction thereof. An area serving as the adhesive application portion 35 contacted by the adhesive 61 is secured, as described later, between the two double-sided pressure-sensitive adhesive tapes 51. In other words, the two double-sided pressure-sensitive adhesive tapes 51 arranged on the same side of the cover glass 31 are arranged in positions interposing the adhesive application portion 35 therebetween. The double-sided pressure-sensitive adhesive tapes 51 arranged on each of the sides of the cover glass 3 are not arranged at the four corners (angled portions) of the cover glass 3. In other words, the double-sided pressure-sensitive adhesive tapes 51 are arranged in positions away from the double-sided pressure-sensitive adhesive tapes 51 arranged on the other sides.

Manner of Pasting Cover Glass 3 to Cover Glass Support Case 42

Figure 5:
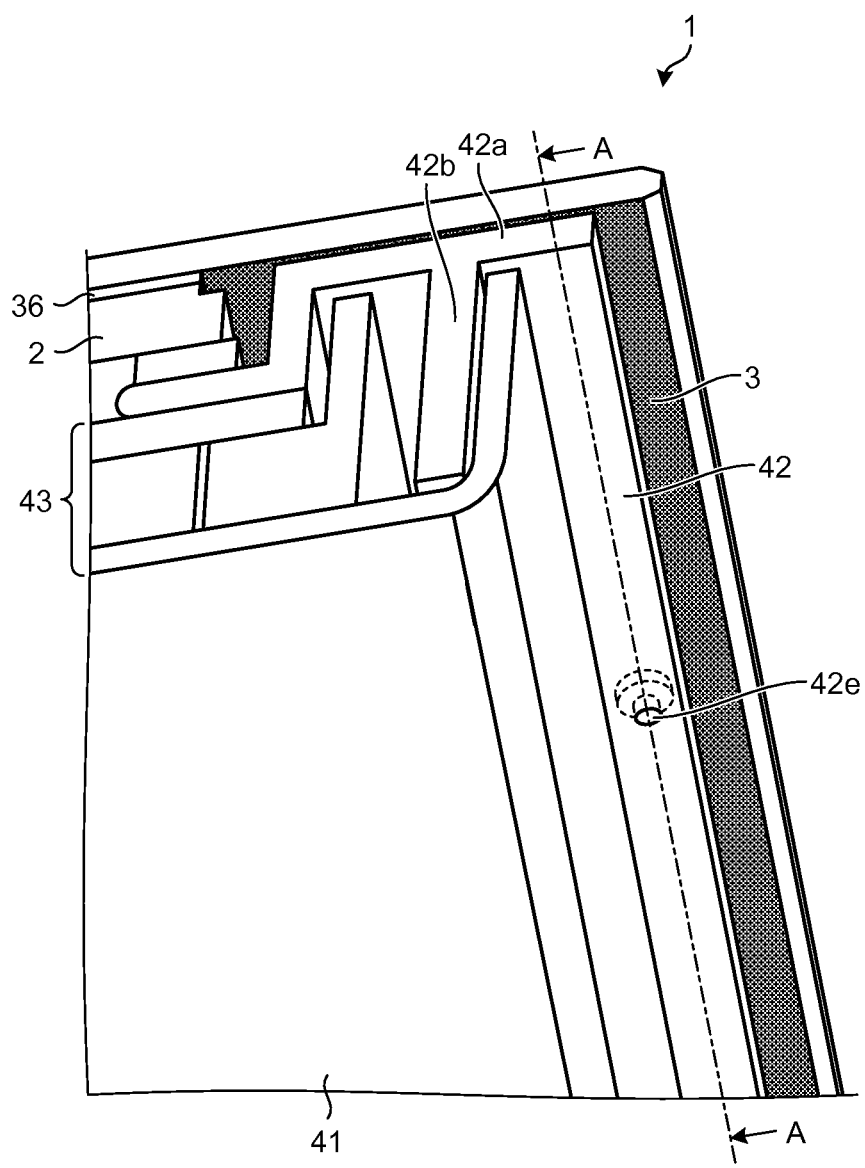
FIG. 5 is a lower perspective view illustrating an adhesive filling opening in the liquid crystal display device according to the embodiment.
Figure 6:
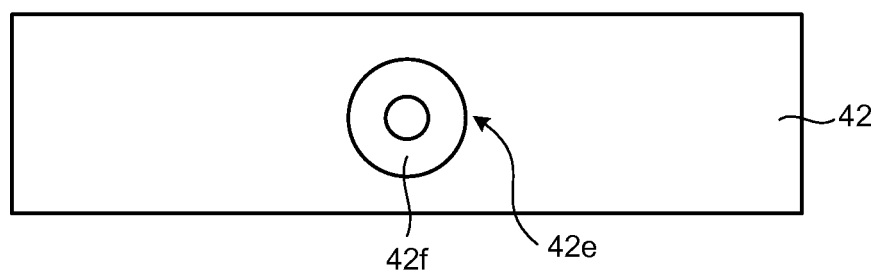
FIG. 6 is a plan view illustrating the adhesive filling opening in a cover glass support case of the embodiment.
Figure 7:
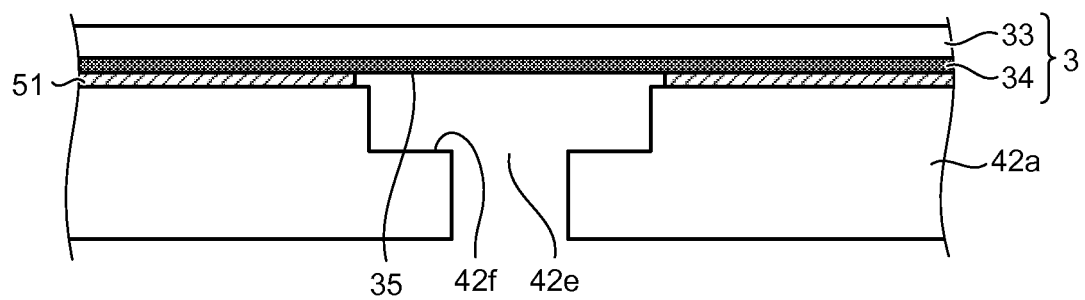
FIG. 7 is an A-A sectional view of FIG. 5.
Figure 8:
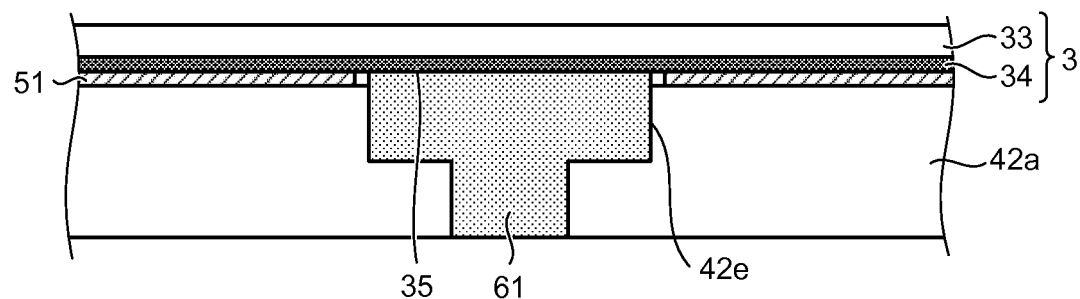
FIG. 8 is a view illustrating a state in which the adhesive filling opening in the cover glass support case of the embodiment is filled with an adhesive.

FIG. 5 is a lower perspective view illustrating an adhesive filling opening in the liquid crystal display device according to the embodiment; FIG. 6 is a plan view illustrating the adhesive filling opening in the cover glass support case of the embodiment; FIG. 7 is an A-A sectional view of FIG. 5; and FIG. 8 is a view illustrating a state in which the adhesive filling opening in the cover glass support case of the embodiment is filled with the adhesive. With reference to FIGS. 5 to 8, a description will be made of a manner of pasting the cover glass 3 to the cover glass support case 42.

As illustrated in FIGS. 5 and 6, an adhesive filling hole 42e is drilled at a portion of the pasting plate portion 42a of the cover glass support case 42 extending over the outside of the sidewall of the housing case 41. As illustrated in FIG. 7, the adhesive filling hole 42e is drilled at a portion (at each of three places) in the pasting plate portion 42a that faces the adhesive application portion 35 of the cover glass 3 when the cover glass 3 is pasted to the pasting plate portion 42a. The adhesive filling hole 42e is formed with a step portion 42f that expands in diameter at a portion on the way from the light source side to the display side of the pasting plate portion 42a.

Next, with reference to FIGS. 7 and 8, a specific description will be made of a procedure of pasting the cover glass 3 including the glass substrate 33 and the light-shielding layer 34 to the cover glass support case 42. As illustrated in FIG. 4 mentioned above, the cover glass 3 having the double-sided pressure-sensitive adhesive tapes 51 pasted on the light-shielding layer 34 of the light-shielding area 31 is pressed to the display side of the pasting plate portion 42a and joined therewith by a pressure-sensitive adhesive force so that the adhesive application portions 35 on the cover glass 3 face the adhesive filling holes 42e of the cover glass support case 42. This causes the pressure-sensitive adhesive force of the double-sided pressure-sensitive adhesive tapes 51 to ensure initial pressure-sensitive adhesion between the cover glass 3 and the cover glass support case 42.

Then, the adhesive filling holes 42e are filled with the adhesive 61 applied through the opening portions on the light source side. FIG. 8 illustrates the state in which the adhesive filling hole 42e is filled with the adhesive 61. The adhesive 61 is solidified in a contact state with the adhesive application portions 35 of the cover glass 3. This causes the cover glass 3 to locally adhere to the pasting plate portion 42a (cover glass support case 42) with the adhesive 61.

The double-sided pressure-sensitive adhesive tapes 51 may be pasted in advance to the pasting plate portion 42a before the cover glass 3 is pasted to the cover glass support case 42.

In the liquid crystal display device 1, both the double-sided pressure-sensitive adhesive tapes 51 and the adhesive 61 provided in the position interposed between the double-sided pressure-sensitive adhesive tapes 51 are used to paste (i.e., to fix) the cover glass 3 to the cover glass support case 42, so that the cover glass 3 is kept from coming unstuck from the cover glass support case 42 although the pressure-sensitive adhesion area is smaller than that in the case of pasting the double-sided pressure-sensitive adhesive tape 51 over the entire circumference of the cover glass support case 42. By the use of both the double-sided pressure-sensitive adhesive tapes 51 and the adhesive 61 provided in the position interposed between the double-sided pressure-sensitive adhesive tapes 51 to fix the cover glass 3 to the cover glass support case 42, both the pressure-sensitive adhesion and the (non-pressure-sensitive) adhesion can be used in combination, and the pasting around the (non-pressure-sensitive) adhesion area can be achieved by the pressure-sensitive adhesion. This can keep the LCD panel 2 pasted on the cover glass 3 from being twisted, and thus can reduce the possibility of occurrence of display unevenness on the display surface of the liquid crystal panel.

In addition, by providing the double-sided pressure-sensitive adhesive tapes 51 in the areas not including the four corners of the cover glass 3 (i.e., by providing the double-sided pressure-sensitive adhesive tapes 51 placed on each of the sides in the positions away from the double-sided pressure-sensitive adhesive tapes 51 placed on the other sides), the liquid crystal display device 1 can reduce at the corners a force and deformation in the twisting direction transmitted from the cover glass support case 42 to the cover glass 3. This can keep the force and deformation in the twisting direction from being transmitted from the cover glass support case 42 to the cover glass 3, and thus can keep the LCD panel 2 pasted on the cover glass 3 from twisting, thus being able to further reduce the possibility of the occurrence of the display unevenness on the display surface of the liquid crystal panel.

The filling of the adhesive filling holes 42e of the pasting plate portion 42a with the adhesive 61 can keep the adhesive 61 from dripping or protruding from a gap between the cover glass 3 and the cover glass support case 42.

The adhesive filling hole 42e filled with the adhesive 61 is formed with the step portion 42f that expands in diameter at the portion on the way from the light source side to the display side of the pasting plate portion 42a. This can keep the adhesive 61 from dripping from the opening on the light source side of the adhesive filling hole 42e when the adhesive filling hole 42e is filled with the adhesive 61. While the adhesive filling hole 42e is formed with the step portion 42f that expands in diameter at the portion on the way from the light source side to the display side of the pasting plate portion 42a, the adhesive filling hole 42e is not limited to this. Specifically, the adhesive filling hole 42e may be formed into a tapered shape whose diameter gradually increases from the light source side to the display side of the pasting plate portion 42a. This can provide the same effect as that described above.

When the cover glass 3 and the cover glass support case 42 of the liquid crystal display device 1 are pasted together, they are first joined together by the double-sided pressure-sensitive adhesive tapes 51 so as to ensure the initial pressure-sensitive adhesion. This can keep the cover glass 3 from being misaligned relative to the cover glass support case 42 until the adhesive 61 subsequently filled into the adhesive filling holes 42e is solidified.

In the liquid crystal display device 1, two of the double-sided pressure-sensitive adhesive tapes 51 are pasted along the side direction of each of the areas on the three of the four sides of the cover glass 3 that lie in the light-shielding area 31 of the surface on the light source side of the cover glass 3, and the adhesive application portion 35 contacted by the adhesive 61 is disposed between the two double-sided pressure-sensitive adhesive tapes 51. However, the liquid crystal display device 1 is not limited to this arrangement. That is, three or more of the double-sided pressure-sensitive adhesive tapes 51 may be pasted along the side direction on one side of the cover glass 3, and the adhesive application portions 35 may be disposed between the respective double-sided pressure-sensitive adhesive tapes 51. In this case, the adhesive filling hole 42e only needs to be drilled in the pasting plate portion 42a corresponding to each of the adhesive application portions 35.

The two double-sided pressure-sensitive adhesive tapes 51 and the adhesive application portion 35 are arranged on each of the three sides of the four sides of the rectangular cover glass 3. This is because, as illustrated in FIG. 2 mentioned above, the FPC 21 connected to the LCD panel 2 extends outward by securing a gap between the remaining one side of the cover glass 3 and the backlight unit 4. Therefore, if this gap can be avoided and the remaining one side on the cover glass 3 can also secure a pasting surface to be pasted to the cover glass support case 42, the double-sided pressure-sensitive adhesive tapes 51 and the adhesive application portion 35 may be arranged on the pasting surface.

Other Embodiment

The liquid crystal display device 1 according to another embodiment of the present disclosure will be described focusing on differences from the liquid crystal display device 1 according to the embodiment. In particular, in the other embodiment, description will be made of the differences from the embodiment regarding arrangement configurations of double-sided pressure-sensitive adhesive tapes and adhesive application portions on the cover glass 3.

Arrangement Configurations of Double-Sided Pressure-Sensitive Adhesive Tapes and Adhesive Application Portions on Cover Glass 3

Figure 9:
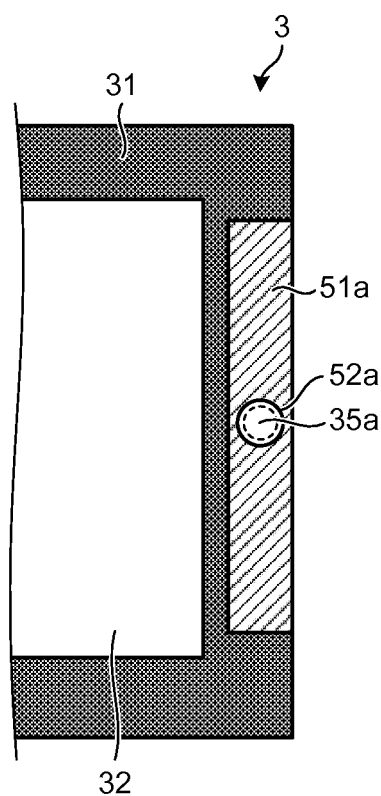
FIG. 9 is a view illustrating an arrangement configuration of a double-sided pressure-sensitive adhesive tape and an adhesive application portion on the cover glass of a liquid crystal display device according to another embodiment of the present disclosure.

FIG. 9 is a view illustrating an arrangement configuration of a double-sided pressure-sensitive adhesive tape and an adhesive application portion on the cover glass of the liquid crystal display device according to the other embodiment.

As illustrated in FIG. 9, one double-sided pressure-sensitive adhesive tape 51a (pressure-sensitive adhesive member) is pasted along the side direction of each of the areas that lie on the three of the four sides of the rectangular cover glass 3 and in the light-shielding area 31 of the surface on the light source side of the cover glass 3. FIG. 9 illustrates, for convenience, the state of only one side of the three sides of the cover glass 3 on which the double-sided pressure-sensitive adhesive tapes 51a are pasted. A substantially central part of the double-sided pressure-sensitive adhesive tape 51a is formed with a tape opening 52a for securing an area of an adhesive application portion 35a contacted by the adhesive 61 (not illustrated in FIG. 9). The double-sided pressure-sensitive adhesive tapes 51a arranged on the respective sides of the cover glass 3 have a configuration so as not to be arranged at the four corners (angled portions) of the cover glass 3. The manner and procedure of pasting the cover glass 3 to the cover glass support case 42 (not illustrated in FIG. 9) are the same as those in the case of the embodiment.

The tape opening 52a for securing the area of the adhesive application portion 35a is formed at one place on the double-sided pressure-sensitive adhesive tape 51a. However, the place is not limited to this. The tape openings 52a may be formed at a plurality of places, and the area of the adhesive application portion 35a may be secured in each of the tape openings 52a. In this case, the adhesive filling hole 42e only needs to be drilled in the pasting plate portion 42a corresponding to each of the adhesive application portions 35a.

The double-sided pressure-sensitive adhesive tape 51a and the adhesive application portion 35a are arranged on each of the three sides of the four sides of the rectangular cover glass 3. This is because, as illustrated in FIG. 2 of the embodiment, the FPC 21 connected to the LCD panel 2 extends outward by securing the gap between the remaining one side of the cover glass 3 and the backlight unit 4.

Therefore, if this gap can be avoided and the remaining one side on the cover glass 3 can also secure a pasting surface to be pasted to the cover glass support case 42, the double-sided pressure-sensitive adhesive tape 51a and the adhesive application portion 35a may obviously be arranged on the pasting surface.

The arrangement configuration of the double-sided pressure-sensitive adhesive tapes 51a and the adhesive application portions 35a on the cover glass 3 can also provide the same effects as those of the embodiment.

As illustrated in FIG. 9, the adhesive application portion 35a bonded by the adhesive 61 is disposed in the tape opening 52a opened in the double-sided pressure-sensitive adhesive tape 51a. This causes a peripheral portion of the tape opening 52a to have an effect of preventing the adhesive 61 from dripping or protruding from the gap between the cover glass 3 and the cover glass support case 42.

Figure 10:
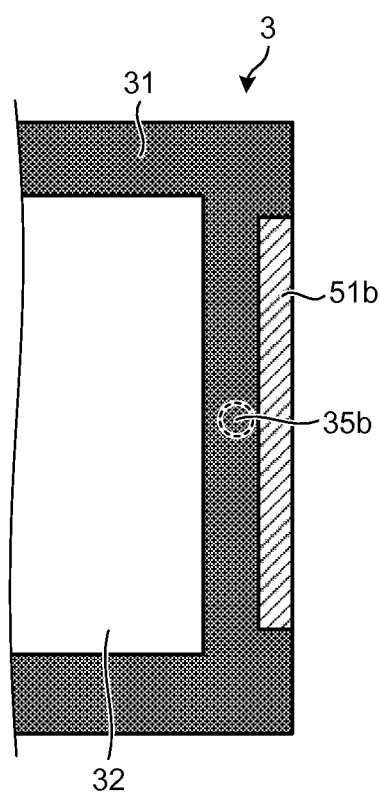
FIG. 10 is a view illustrating another arrangement configuration of a double-sided pressure-sensitive adhesive tape and an adhesive application portion on the cover glass of the liquid crystal display device according to the other embodiment.
Figure 11:
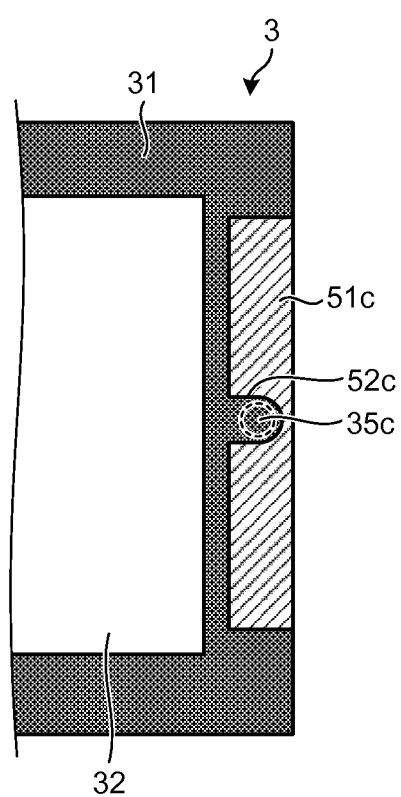
FIG. 11 is a view illustrating another arrangement configuration of a double-sided pressure-sensitive adhesive tape and an adhesive application portion on the cover glass of the liquid crystal display device according to the other embodiment.

In particular, for the purpose of preventing the adhesive 61 from dripping or protruding outward from the gap between the cover glass 3 and the cover glass support case 42, an arrangement configuration of a double-sided pressure-sensitive adhesive tape and an adhesive application portion illustrated in FIG. 10 or 11 can be employed. FIGS. 10 and 11 are views illustrating other arrangement configurations of the double-sided pressure-sensitive adhesive tape and the adhesive application portion on the cover glass 3. Each of FIGS. 10 and 11 illustrates, for convenience, the state of only one side of the three sides of the cover glass 3 on which the double-sided pressure-sensitive adhesive tapes are pasted.

In FIG. 10, one double-sided pressure-sensitive adhesive tape 51b (pressure-sensitive adhesive member) is pasted along the side direction of each of the areas that lie on the three of the four sides of the rectangular cover glass 3 and in the light-shielding area 31 of the surface on the light source side of the cover glass 3. An area serving as an adhesive application portion 35b contacted by the adhesive 61 (not illustrated in FIG. 10) is secured at a portion inside the double-sided pressure-sensitive adhesive tape 51b. The double-sided pressure-sensitive adhesive tapes 51b arranged on the respective sides of the cover glass 3 have a configuration so as not to be arranged at the four corners (angled portions) of the cover glass 3. The area of the adhesive application portion 35b is secured at one place in the portion inside the double-sided pressure-sensitive adhesive tape 51b. However, the place is not limited to this. A plurality of places may be secured as areas of the adhesive application portions 35b. In this case, the adhesive filling hole 42e only needs to be drilled in the pasting plate portion 42a corresponding to each of the adhesive application portions 35b.

In FIG. 11, one double-sided pressure-sensitive adhesive tape 51c (pressure-sensitive adhesive member) is pasted along the side direction of each of the areas that lie on the three of the four sides of the rectangular cover glass 3 and in the light-shielding area 31 of the surface on the light source side of the cover glass 3. At a substantially central part of the double-sided pressure-sensitive adhesive tape 51c, a tape cutout portion 52c is formed so as to be cut out from the inside outward for securing an area of an adhesive application portion 35c contacted by the adhesive 61 (not illustrated in FIG. 11). The double-sided pressure-sensitive adhesive tapes 51c arranged on the respective sides of the cover glass 3 have a configuration so as not to be arranged at the four corners (angled portions) of the cover glass 3. The tape cutout portion 52c for securing the area of the adhesive application portion 35c is formed at one place on the double-sided pressure-sensitive adhesive tape 51c. How-ever, the place is not limited to this. The tape cutout portions 52c may be formed at a plurality of places, and the area of the adhesive application portion 35c may be secured in each of the tape cutout portions 52c. In this case, the adhesive filling hole 42e only needs to be drilled in the pasting plate portion 42a corresponding to each of the adhesive application portions 35c.

As illustrated in FIGS. 10 and 11, the double-sided pressure-sensitive adhesive tapes are arranged in outer positions on the cover glass 3 with respect to the adhesive application portions 35b and 35c bonded by the adhesive 61. The arrangement of the double-sided pressure-sensitive adhesive tapes in this manner can prevent the adhesive 61 from dripping or protruding outward from the gap between the cover glass 3 and the cover glass support case 42 in particular.

Figure 12:
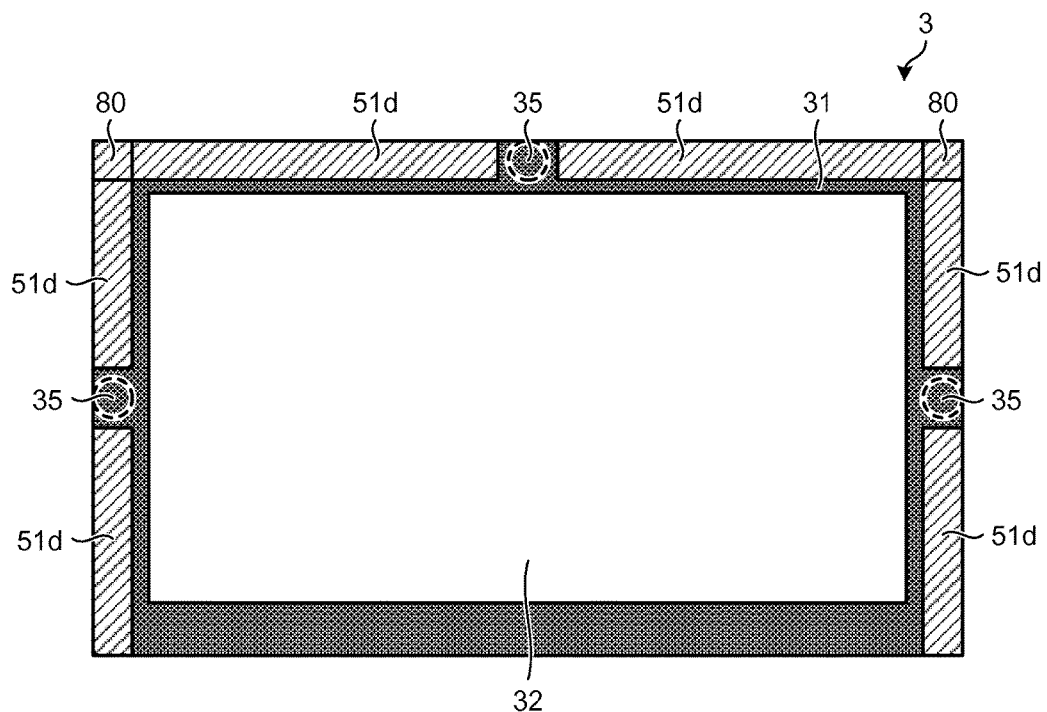
FIG. 12 is a view illustrating another arrangement configuration of double-sided pressure-sensitive adhesive tapes and the adhesive application portions on the cover glass of the liquid crystal display device according to the other embodiment.

FIG. 12 is a view illustrating another arrangement configuration of double-sided pressure-sensitive adhesive tapes and the adhesive application portions on the cover glass of the liquid crystal display device according to the other embodiment. While all of the above-described embodiments provide the double-sided pressure-sensitive adhesive tapes in the areas not including the four corners of the cover glass 3, the areas are not limited to these examples. The liquid crystal display panel may be provided with the double-sided pressure-sensitive adhesive tapes in areas including the four corners of the cover glass 3.

In FIG. 12, the rectangular cover glass 3 has areas that lie along the three of the four sides of the outer edge of the surface thereof facing the cover glass support case 42 and that overlap the light-shielding area 31, and two double-sided pressure-sensitive adhesive tapes (pressure-sensitive adhesive members) 51d are pasted on each of the areas along the side direction thereof. The adhesive application portion 35 is provided between the two double-sided pressure-sensitive adhesive tapes 51d. The two double-sided pressure-sensitive adhesive tapes 51d arranged on the same side of the cover glass 31 are arranged in positions interposing the adhesive application portion 35 therebetween. Each of the double-sided pressure-sensitive adhesive tapes 51d arranged on each of the sides of the cover glass 3 extends up to a corner (angled portion) 80 of the cover glass 3. In other words, the double-sided pressure-sensitive adhesive tape 51d contacts another double-sided pressure-sensitive adhesive tape 51d arranged on another side. When another double-sided pressure-sensitive adhesive tape 51d is provided on another side (i.e., on a contacted side), the double-sided pressure-sensitive adhesive tape 51d of the present embodiment overlaps the double-sided pressure-sensitive adhesive tape 51d provided on the side contacted at the corner 80.

The double-sided pressure-sensitive adhesive tapes 51d of FIG. 12 are arranged on the sides of the outer edge, and a part arranged on each of the sides contacts a part arranged on another of the sides. Providing the double-sided pressure-sensitive adhesive tapes 51d up to the corners (angled portions) 80 of the sides also allows the liquid crystal display device to provide the same effects as those described above. Providing the double-sided pressure-sensitive adhesive tapes 51d up to the corners (angled portions) 80 of the sides can increase the area of pasting by pressure-sensitive adhesion, and thus can further reduce the possibility of separation and misalignment between the cover glass 3 and the cover glass support case 42.

Manner of Mounting Liquid Crystal Display Device 1 on Automobile 101

Figure 13:
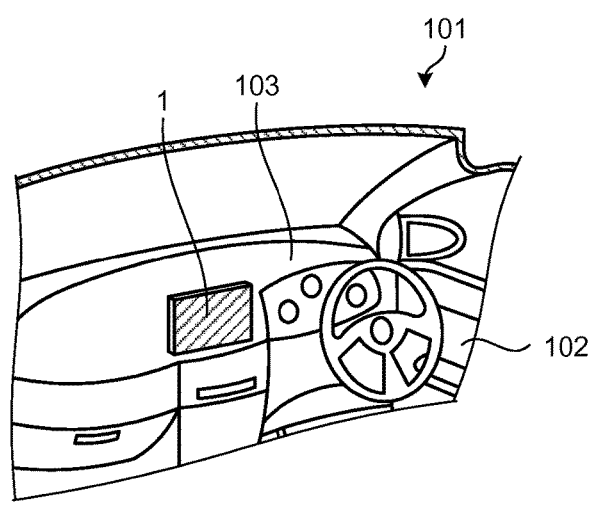
FIG. 13 is a view illustrating a state in which the liquid crystal display device according to the embodiment is installed on a dashboard of an automobile.

FIG. 13 is a view illustrating a state in which the liquid crystal display device according to the embodiment is installed on a dashboard of an automobile. As illustrated in FIG. 13, for example, the liquid crystal display device 1 according to the present embodiment is installed on a dashboard 103 on the driver's seat side of a vehicle interior 102 of an automobile 101. In this case, the liquid crystal display device 1 is used for, for example, navigation display in a vehicle navigation system, display of a music operation screen, or movie playing display.

As described above, in the liquid crystal display device 1, the pressure-sensitive adhesive force by the double-sided pressure-sensitive adhesive tapes 51 and the adhesive force by the adhesive 61 paste and fix the cover glass 3 to the cover glass support case 42. This can keep the cover glass 3 from being misaligned or coming unstuck from the cover glass support case 42. The above-described effect is particularly strong under vibrational environments such as those in which the liquid crystal display device 1 is installed in an automobile.

Besides the above-mentioned vehicle navigation system, a personal computer, an LCD television, and a mobile phone are exemplified as an electronic apparatus to which the liquid crystal display device 1 according to the embodiment or the other embodiment can be applied.

The description given above does not limit the embodiments of the present disclosure. The constituent elements of the embodiments described above include elements easily conceived by those skilled in the art, substantially identical elements, and elements in the range of what are called equivalents. In addition, the constituent elements can be omitted, replaced, and/or modified in various ways within the scope not deviating from the gist of the embodiments described above. For example, the above-described embodiments provide the double-sided pressure-sensitive adhesive tapes between the cover glass 3 and the cover glass support case 42 pasted together by the pressure-sensitive adhesive force of the double-sided pressure-sensitive adhesive tapes. However, the present disclosure is not limited to this. Other pressure-sensitive adhesive members than the double-sided pressure-sensitive adhesive tapes can also be used provided that the cover glass 3 and the cover glass support case 42 can be pasted together by pressure-sensitive adhesion.

Aspects of Present Disclosure

The present disclosure includes the following aspects:
(1) A liquid crystal display device comprising:
   a liquid crystal panel;
   a backlight that is stacked on the liquid crystal panel and illuminates the liquid crystal panel;
   a display cover that covers a display surface of the liquid crystal panel;
   a housing case that houses the backlight;
   a display cover support case to which the housing case is fixed and on which, near
   an outer edge of a surface facing the display cover of the display cover support case, a pasting surface to which the display cover is to be pasted is formed;
   pressure-sensitive adhesive members that are arranged between the pasting surface of the display cover support case and the display cover, and join together the display cover and the display cover support case with a pressure-sensitive adhesive force; and
   an adhesive that is arranged in an area located on the pasting surface and interposed between the pressure-sensitive adhesive members in a longitudinal direction of the pasting surface, and that bonds together the display cover and the display cover support case.
(2) The liquid crystal display device according to (1), wherein the pressure-sensitive adhesive members are arranged on a plurality of sides of the outer edge, and the pressure-sensitive adhesive member arranged on each of the sides is separated from the pressure-sensitive adhesive member arranged on another of the sides.
(3) The liquid crystal display device according to (1), wherein the pressure-sensitive adhesive members are arranged on a plurality of sides of the outer edge, and the pressure-sensitive adhesive member arranged on each of the sides contacts the pressure-sensitive adhesive member arranged on another of the sides.
(4) The liquid crystal display device according to (1), wherein
   a pasting plate portion is disposed on the pasting surface of the display cover support case;
   the pasting plate portion has an adhesive filling hole filled with the adhesive drilled in the pasting plate portion; and
   the adhesive filling hole is filled with the adhesive.
(5) The liquid crystal display device according to (4), wherein the adhesive filling hole has an opening diameter on a side of the pasting surface that is larger than an opening diameter on a side opposite to the pasting surface.
(6) The liquid crystal display device according to (1), wherein
   the pressure-sensitive adhesive members are formed with openings; and
   the adhesive is arranged in the openings.
(7) The liquid crystal display device according to (1), wherein the adhesive is arranged on a side nearer to a center of the liquid crystal panel than the pressure-sensitive adhesive members interposed between the display cover and the pasting surface of the display cover support case.
(8) The liquid crystal display device according to (1), wherein
   the pressure-sensitive adhesive members are each formed with a cutout portion;
   the pressure-sensitive adhesive members are arranged, when interposed between the display cover and the pasting surface of the display cover support case, so that the cutout portion takes a shape cut out from an inside outward; and
   the adhesive is arranged at the cutout portion.
(9) An electronic apparatus comprising:
   the liquid crystal display device according to (1); and
   a control device that controls a display operation of the liquid crystal display device.
(10) A method of fixing a display cover that pastes and fixes the display cover covering a display surface of a liquid crystal panel to a display cover support case fixed to a housing case housing a backlight, the method comprising:
   arranging pressure-sensitive adhesive members between a pasting surface to which the display cover is to be pasted formed on the display cover support case and a surface facing the pasting surface of the display cover, and joining together the display cover and the display cover support case with a pressure-sensitive adhesive force; and
   filling, with an adhesive, an adhesive filling hole drilled in a pasting plate portion including the pasting surface formed on the display cover support case, and bringing the adhesive into contact with the display cover so as to bond together the display cover and the display cover support case.

(11) The method of fixing a display cover according to (10), wherein the pressure-sensitive adhesive members are arranged on a plurality of sides of an outer edge of the display cover, and the pressure-sensitive adhesive member arranged on each of the sides is separated from the pressure-sensitive adhesive member arranged on another of the sides.

As a method of pasting the display cover to the display cover support case, the present disclosure uses both the pressure-sensitive adhesive members and the adhesive, and arranges the adhesive in the area interposed, in the longitudinal direction of the pasting surface, between the pressure-sensitive adhesive members, so that the display cover can be kept from being misaligned or coming unstuck from the display cover support case, and the display unevenness on the display surface of the liquid crystal panel can be prevented from occurring easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
a liquid crystal panel;
a backlight that is stacked on the liquid crystal panel and illuminates the liquid crystal panel;
a display cover that covers a display surface of the liquid crystal panel;
a housing case that houses the backlight;
a display cover support case to which the housing case is fixed and on which, near an outer edge of a surface facing the display cover of the display cover support case, a pasting surface to which the display cover is to be pasted is formed;
pressure-sensitive adhesive members each have a longitudinal direction along an outer edge of the display cover, wherein the pressure-sensitive adhesive members are arranged between the pasting surface of the display cover support case and the display cover, and wherein the pressure-sensitive adhesive members join together the display cover and the display cover support case with a pressure-sensitive adhesive force; and
an adhesive application portion that is arranged on the pasting surface and is configured to bond together the display cover and the display cover support case,
wherein the adhesive application portion is provided in:
an area between adjacent pressure-sensitive adhesive members that are adjacent in the longitudinal direction, wherein the adhesive application portion is provided along the longitudinal direction of the adjacent pressure-sensitive adhesive members; or
an area surrounded by one of the pressure-sensitive adhesive members at a center of the one of the pressure-sensitive adhesive members, wherein the one of the pressure-sensitive adhesive members includes a first portion and a second portion, and the first portion and the second portion extends in the longitudinal direction, wherein the adhesive application portion is provided between the first portion and the second portion, and wherein the first portion, the second portion and the adhesive application portion are arranged in the longitudinal direction.

2. The liquid crystal display device according to claim 1, the pressure-sensitive adhesive members are arranged on a plurality of sides of the outer edge, and the pressure-sensitive adhesive member arranged on each of the sides is separated from the pressure-sensitive adhesive member arranged on another of the sides.

3. The liquid crystal display device according to claim 1, the pressure-sensitive adhesive members are arranged on a plurality of sides of the outer edge, and the pressure-sensitive adhesive member arranged on each of the sides contacts the pressure-sensitive adhesive member arranged on another of the sides.

4. The liquid crystal display device according to claim 1,
a pasting plate portion is disposed on the pasting surface of the display cover support case;
the pasting plate portion has an adhesive filling hole drilled in the pasting plate portion; and
the adhesive filling hole is filled with the adhesive to provide the adhesive application portion.

5. The liquid crystal display device according to claim 4, the adhesive filling hole has an opening diameter on a side of the pasting surface that is larger than an opening diameter on a side opposite to the pasting surface.

6. The liquid crystal display device according to claim 4, wherein side surfaces of the adhesive application portion touch the pasting plate portion without touching the pressure-sensitive adhesive members.

7. The liquid crystal display device according to claim 1,
the pressure-sensitive adhesive members are formed with openings; and
the adhesive is arranged in the openings.

8. The liquid crystal display device according to claim 1,
the pressure-sensitive adhesive members are each formed with a cutout portion;
the pressure-sensitive adhesive members are arranged, when interposed between the display cover and the pasting surface of the display cover support case, so that the cutout portion takes a shape cut out from an inside outward; and
the adhesive application portion is arranged at the cutout portion.

9. An electronic apparatus comprising:
the liquid crystal display device according to claim 1; and
a control device that controls a display operation of the liquid crystal display device.

10. The liquid crystal display device according to claim 1, wherein
the adhesive application portion is provided in the area surrounded by one of the pressure-sensitive adhesive members at the center of the one of the pressure-sensitive adhesive members.

11. A method of fixing a display cover that pastes and fixes the display cover covering a display surface of a liquid crystal panel to a display cover support case fixed to a housing case housing a backlight, the method comprising:
arranging pressure-sensitive adhesive members between a pasting surface to which the display cover is to be pasted formed on the display cover support case and a surface facing the pasting surface of the display cover, joining together the display cover and the display cover support case with a pressure-sensitive adhesive force; and filling, with an adhesive, an adhesive filling hole to provide an adhesive application portion, the adhesive filling hole being drilled in a pasting plate portion including the pasting surface formed on the display cover support case, and bringing the adhesive application portion into contact with the display cover so as to bond together the display cover and the display cover support case, wherein each of the pressure-sensitive adhesive members has a longitudinal direction along an outer edge of the display cover, and wherein the adhesive application portion is provided in:
an area between adjacent pressure-sensitive adhesive members that are adjacent in the longitudinal direction; or
an area surrounded by one of the pressure-sensitive adhesive members at a center of the one of the pressure-sensitive adhesive members, wherein the one of the pressure-sensitive adhesive members includes a first portion and a second portion, and the first portion and the second portion extends in the longitudinal direction, wherein the adhesive application portion is provided between the first portion and the second portion, and wherein the first portion, the second portion and the adhesive application portion are arranged in the longitudinal direction.

12. The method of fixing a display cover according to claim 11, the pressure-sensitive adhesive members are arranged on a plurality of sides of an outer edge of the display cover, and the pressure-sensitive adhesive member arranged on each of the sides is separated from the pressure-sensitive adhesive member arranged on another of the sides.

* * * * *